US008424895B1

(12) United States Patent
Stokes

(10) Patent No.: US 8,424,895 B1
(45) Date of Patent: Apr. 23, 2013

(54) PORTABLE AUXILIARY JACK STAND FOR TWO-WHEELED VEHICLES

(76) Inventor: Daniel P. Stokes, Keyser, WV (US)

(*) Notice: Subject to any disclaimer, the term of this patent is extended or adjusted under 35 U.S.C. 154(b) by 316 days.

(21) Appl. No.: 12/786,781

(22) Filed: May 25, 2010

(51) Int. Cl.
B62H 7/00 (2006.01)
B62H 5/00 (2006.01)

(52) U.S. Cl.
USPC .............................. 280/293; 280/297; 280/304

(58) Field of Classification Search .................. 280/293, 280/297, 304; 248/161, 352; 254/1, 8, 93–94, 254/112
See application file for complete search history.

(56) References Cited

U.S. PATENT DOCUMENTS

| 3,712,640 | A | | 1/1973 | Shipman et al. | |
| 3,998,470 | A | | 12/1976 | Houston | |
| 4,541,650 | A | | 9/1985 | Cline | |
| 4,817,977 | A | | 4/1989 | Bookbinder | |
| 4,934,203 | A | * | 6/1990 | Bailey et al. | 74/89.35 |
| 4,971,347 | A | | 11/1990 | Cline | |
| 4,986,557 | A | * | 1/1991 | Muszynski | 280/298 |
| 5,022,810 | A | * | 6/1991 | Sherrow et al. | 414/501 |
| 5,067,739 | A | * | 11/1991 | Kuan | 280/304 |
| 5,358,265 | A | * | 10/1994 | Yaple | 280/293 |
| 5,413,303 | A | * | 5/1995 | Lee | 248/354.1 |
| 5,607,173 | A | * | 3/1997 | Lai | 280/293 |
| 5,673,591 | A | * | 10/1997 | Kimura et al. | 74/89.35 |
| 5,953,802 | A | * | 9/1999 | Radzio | 29/239 |
| 6,150,929 | A | * | 11/2000 | Wang | 340/432 |
| 6,276,707 | B1 | * | 8/2001 | Ungvari | 280/293 |
| 6,293,723 | B1 | * | 9/2001 | Kiefer | 403/21 |
| 6,464,421 | B1 | * | 10/2002 | Kiefer | 403/21 |
| 6,494,005 | B2 | * | 12/2002 | Zimmerman | 52/296 |
| 6,712,377 | B1 | | 3/2004 | Meiring | |
| 6,786,499 | B2 | * | 9/2004 | Ackley | 280/276 |
| 6,793,110 | B2 | * | 9/2004 | Hamilton | 224/413 |
| 6,837,461 | B1 | * | 1/2005 | Shiao | 244/129.5 |
| 6,880,416 | B2 | * | 4/2005 | Koch | 74/89.35 |
| 7,097,191 | B2 | * | 8/2006 | Griggs | 280/301 |
| 7,516,973 | B2 | * | 4/2009 | Mielke | 280/293 |
| 7,584,979 | B2 | * | 9/2009 | Labonte et al. | 280/293 |
| 2005/0156403 | A1 | | 7/2005 | Labonte et al. | |

* cited by examiner

Primary Examiner — John Walters
Assistant Examiner — James Triggs
(74) Attorney, Agent, or Firm — Montgomery Patent & Design; Robert C. Montgomery

(57) ABSTRACT

A portable auxiliary jackstand for a two-wheeled vehicle which provides the vehicle with additional stability when parked is disclosed. The stand comprises a ratchet or detent mechanism which provides a means for adjusting and locking its length. An upper end accommodates various interchangeable adapters intended to engage the frame, foot peg or other structural member of the vehicle. A lower end accommodates various interchangeable feet designed to provide the necessary friction against the prevailing texture of the ground surface. The stand can be applied to either side of the vehicle and is designed to allow the user to select the configuration which is best suited to the conditions of the parking space ground.

17 Claims, 10 Drawing Sheets

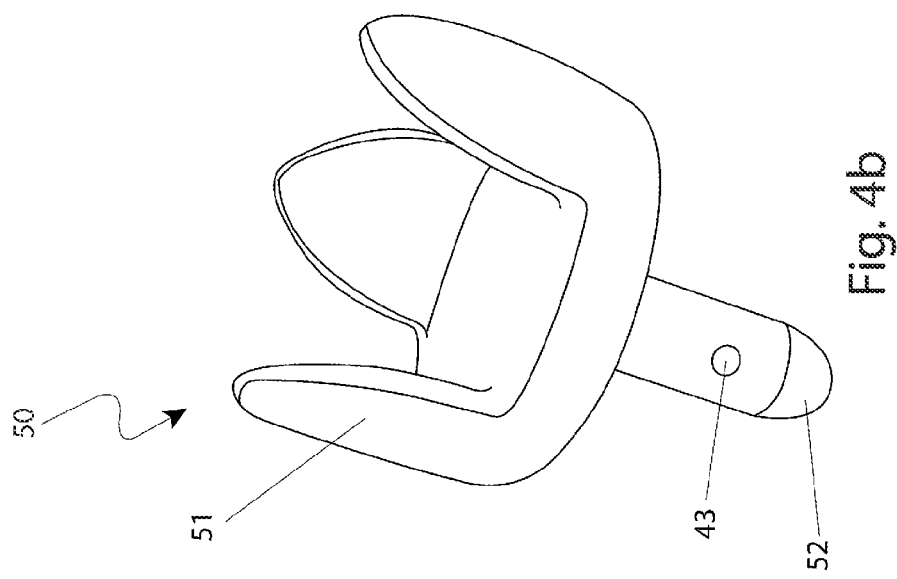
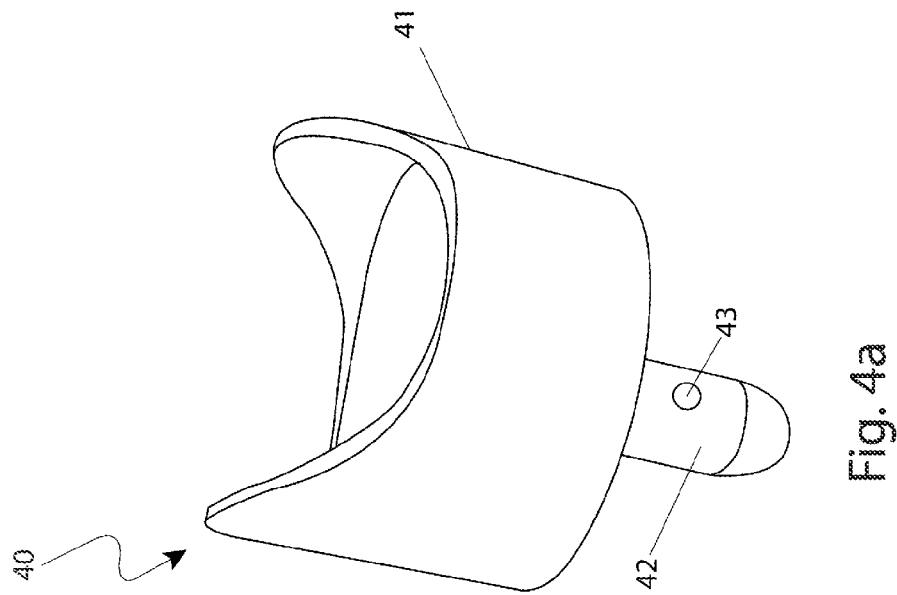

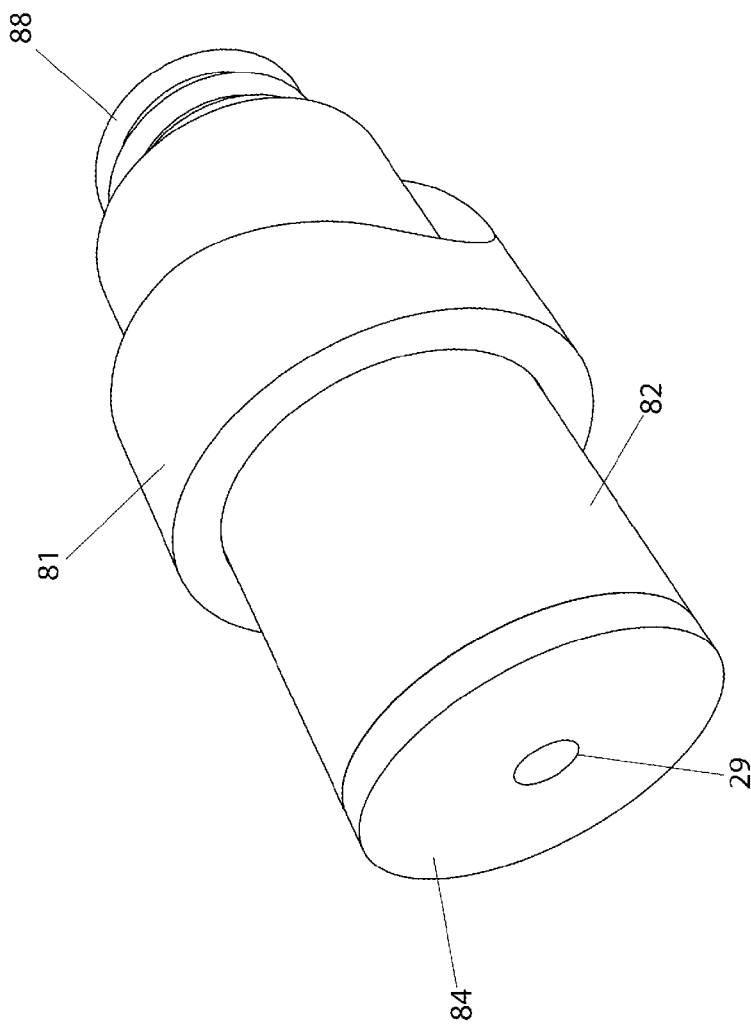

PORTABLE AUXILIARY JACK STAND FOR TWO-WHEELED VEHICLES

RELATED APPLICATIONS

The present invention was first described in a notarized Official Record of Invention on Apr. 21, 2009, that is on file at the offices of Montgomery Patent and Design, LLC, the entire disclosures of which are incorporated herein by reference.

FIELD OF THE INVENTION

The present invention relates generally to two-wheeled motor vehicles such as motorcycles, and in particular, to an adjustable auxiliary jack stand for such vehicles.

BACKGROUND OF THE INVENTION

Many popular varieties of two-wheeled motor vehicles exist, including common vehicles such as motorcycles, motorbikes, and the like. Due to the two-wheeled nature of such vehicles, they are generally not able to maintain their position in an upright manner with aid, unlike traditional four-wheeled vehicles. Many vehicles incorporate integral kickstands which are selectively deployable along a side ground surface portion of the vehicle for providing support to the vehicle in a leaning position.

While such jack stands generally allow a vehicle to remain in such a position in flat, solid, and undisturbed conditions, it does not take much disturbance to cause the jack stand to fail. The jack stands are generally hingedly attached to the side of the vehicle, and pressure or movement along this hinge often leads to collapse of the jack stand. Also, the stand provides little stability in several directions. This results in the vehicle falling and landing on a side portion which can often lead to costly aesthetic and mechanical damages to the vehicle. Conditions such as soft ground, sloped surfaces, and windy weather are particularly troublesome to the stability of these vehicles.

Various attempts have been made to provide device for stabilizing motorcycles and the like. Examples of these attempts can be seen by reference to several U.S. patents. U.S. Pat. No. 3,998,470, issued in the name of Houston, describes an auxiliary attachment for use with an existing kickstand which serves to increase the area of contact with a ground surface.

U.S. Pat. No. 4,817,977, issued in the name of Bookbinder, describes an electrically operated motorcycle stand with a telescopingly extendible leg carried by the frame of the motorcycle.

U.S. Pat. No. 6,712,377, issued in the name of Meiring, describes a motorcycle support brace removably attachable to a lower portion of a motorcycle frame designed to temporarily support a motorcycle in a slight leaning position for cleaning and servicing.

While these devices fulfill their respective, particular objectives, each of these references suffer from one (1) or more of the aforementioned disadvantages. Many such devices are not adapted for use with an existing vehicle without significant installation ahead of time. Also, many such devices are not suitable for engaging a vehicle in a variety of positions to provide optimal stabilization based upon the orientation of the vehicle. Furthermore, many such devices are not adjustable with respect to height, support angle, and surface angle. Accordingly, there exists a need for a two-wheeled vehicle stabilizing device without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a means to provide portable auxiliary support to two-wheeled vehicles in a manner which allows the support to securely engage a variety of existing vehicles quickly and adjustably. Thus, the object of the present invention is to solve the aforementioned disadvantages and provide for this need.

To achieve the above objectives, it is an object of the present invention to comprise a portable auxiliary jack stand which provides a means for adding stability to a parked two-wheeled vehicle.

Another object of the present invention is to engage a suitable structural portion of a vehicle via a top adapter portion.

Yet still another object of the present invention is to adjustably engage a ground surface in a flat, secure manner via a ball jointed foot pad assembly.

Yet still another object of the present invention is to provide a means for adjusting the height of the apparatus via first and second telescoping members and a pawl assembly. The telescoping members comprise a middle portion of the apparatus and allow a user to selectively increment the distance between the adapter and foot pad assembly. The inside space portion of the telescoping assembly further comprises a spring which assists in the deployment of the system.

Yet still another object of the present invention is to provide a locking and adjusting means to the telescoping assembly via the pawl assembly. The pawl assembly comprises a housing, a pawl, a spindle and a pawl spring which are manipulated by a user via use of an adjusting knob. The pawl assembly allows a user to selectively lock the height of the system, incrementally adjust the height of the system, and subsequently collapse the telescoping system for storage and transport.

Yet still another object of the present invention is to comprise a plurality of top adapters and to allow a user to selectively removably attach a desired adapter to the top of the telescoping assembly for engagement with a desired portion of the existing vehicle body. The adapters are selectively attached via a pin and detent ball system and comprise various shapes useful for engaging circular structural members, flat structural members, or the like.

Yet still another object of the present invention is to provide adjustable positioning of the system relative to the degree of inclination of the ground via eccentric mount of a base foot pad portion. The base portion is further connected to the telescoping assembly via a ball joint which allows for adjustment of the foot portion in all three dimensions.

Yet still another object of the present invention is to comprise a plurality of foot portions and to allow a user to selectively removably attach a desired foot portion for secure engagement with a present ground surface. The various foot pad assemblies comprise a bottom surface having an anti-skid configuration such as an anti-skid surface material, cleats, a serrated surface, or the like.

Yet still another object of the present invention is to provide a method of utilizing the device that provides a unique means of collapsing and easily transporting the apparatus, selectively extending the apparatus to provide a desired length for the parked stabilization of a two-wheeled vehicle, selectively providing a top adapter for secure engagement of a desired structural member of the vehicle, selectively providing a foot pad assembly for maximum anti-skid properties with a present ground surface, and quickly and securely positioning the configured apparatus in place between the vehicle and ground surface to provide additional support in order to prevent tipping due to an uneven ground surface, movement due to bumping or wind, and the like.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 4a is a perspective view of a bi-furcated adapter 40 for the portable auxiliary jack stand system 10 for the two-wheeled vehicle 90, according to the preferred embodiment of the present invention;

FIG. 4b is a perspective view of a tri-furcated adapter 50 for the portable auxiliary jack stand system 10 for the two-wheeled vehicle 90, according to the preferred embodiment of the present invention;

Figure 1:
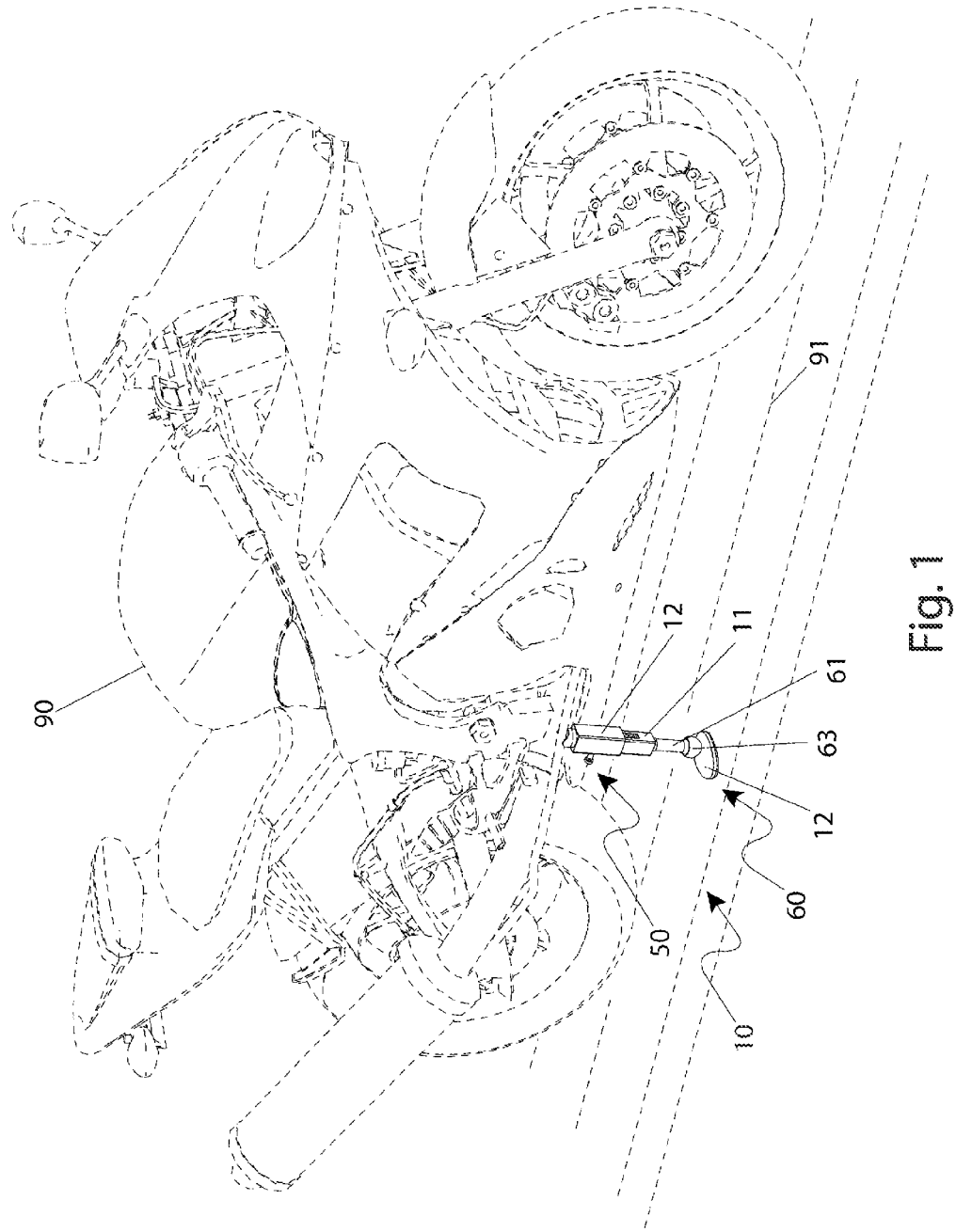
FIG. 1 is an environmental perspective view of a portable auxiliary jack stand system 10 for a two-wheeled vehicle 90, according to a preferred embodiment of the present invention.

DESCRIPTIVE KEY 10 auxiliary jack stand
11 first telescoping member
12 second telescoping member
13 top portion
14 bottom portion
15 ratchet
16 adjusting knob
17 gate
18 main spring
19 pawl housing
21 pawl spring
22 pawl spring end
23 spindle
24 first end
25 second end
26 pawl
27 bore
28 adapter mounting aperture
29 foot mounting aperture
40 bi-furcated adapter
41 first body
42 first pin
43 detent ball
50 tri-furcated adapter
51 second body
52 second pin
60 ball joint foot pad assembly
61 first stem
62 first shoulder
63 ball joint
64 base
66 non-skid pad
70 serrated foot assembly
71 second stem
72 second shoulder
73 foot
74 serration
80 alternate auxiliary stand
81 alternate first telescoping member
82 second alternate telescoping member
83 alternate top portion
84 alternate bottom portion
85 detent bullet
86 grip
87a first position notch
87b second position notch
88 alternate main spring
89a first detent aperture
89b second detent aperture
90 two-wheeled vehicle
91 ground
92 kick stand

DETAILED DESCRIPTION OF THE PREFERRED EMBODIMENT

Figure 5B:
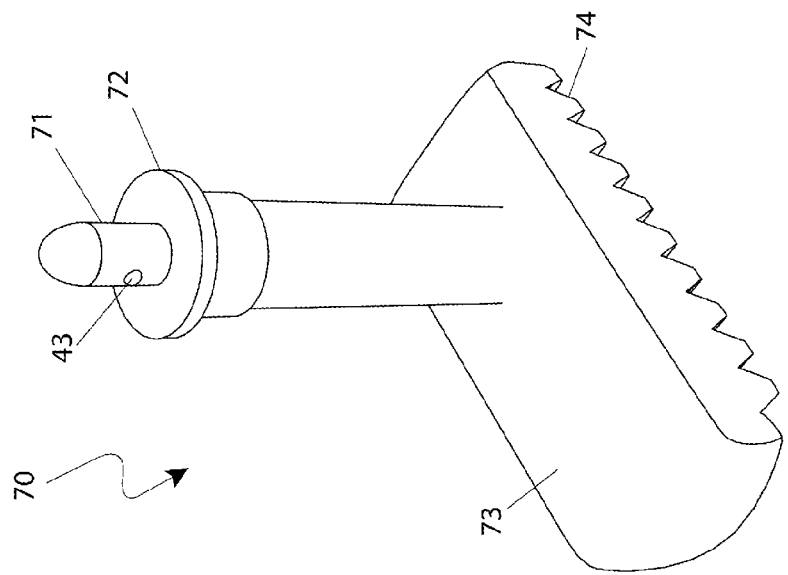
FIG. 5b is a perspective view of a serrated foot assembly 70 for the portable auxiliary jack stand system 10 for the two-wheeled vehicle 90, according to the preferred embodiment of the present invention.
Figure 5A:
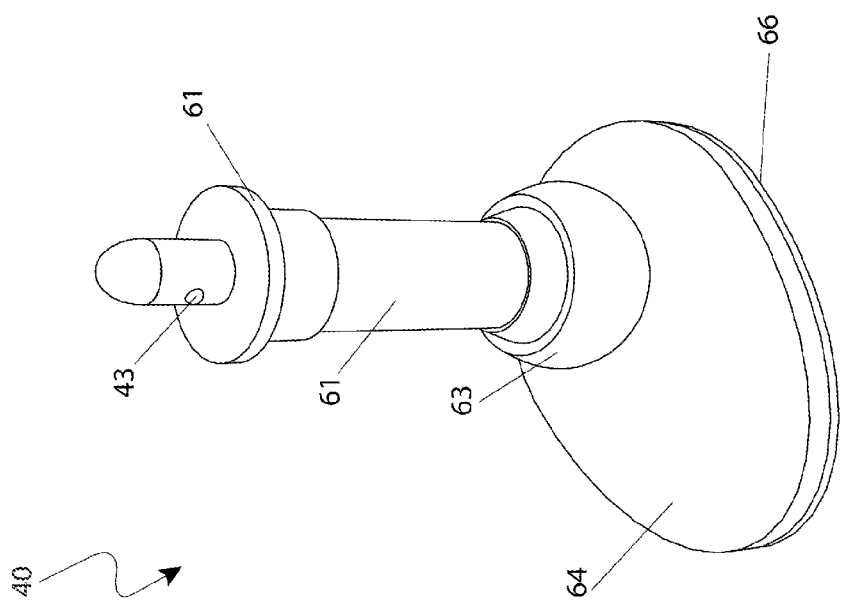
FIG. 5a is a perspective view of a ball-joint foot pad assembly 60 for the portable auxiliary jack stand system 10 for the two-wheeled vehicle 90, according to the preferred embodiment of the present invention.
Figure 6A:
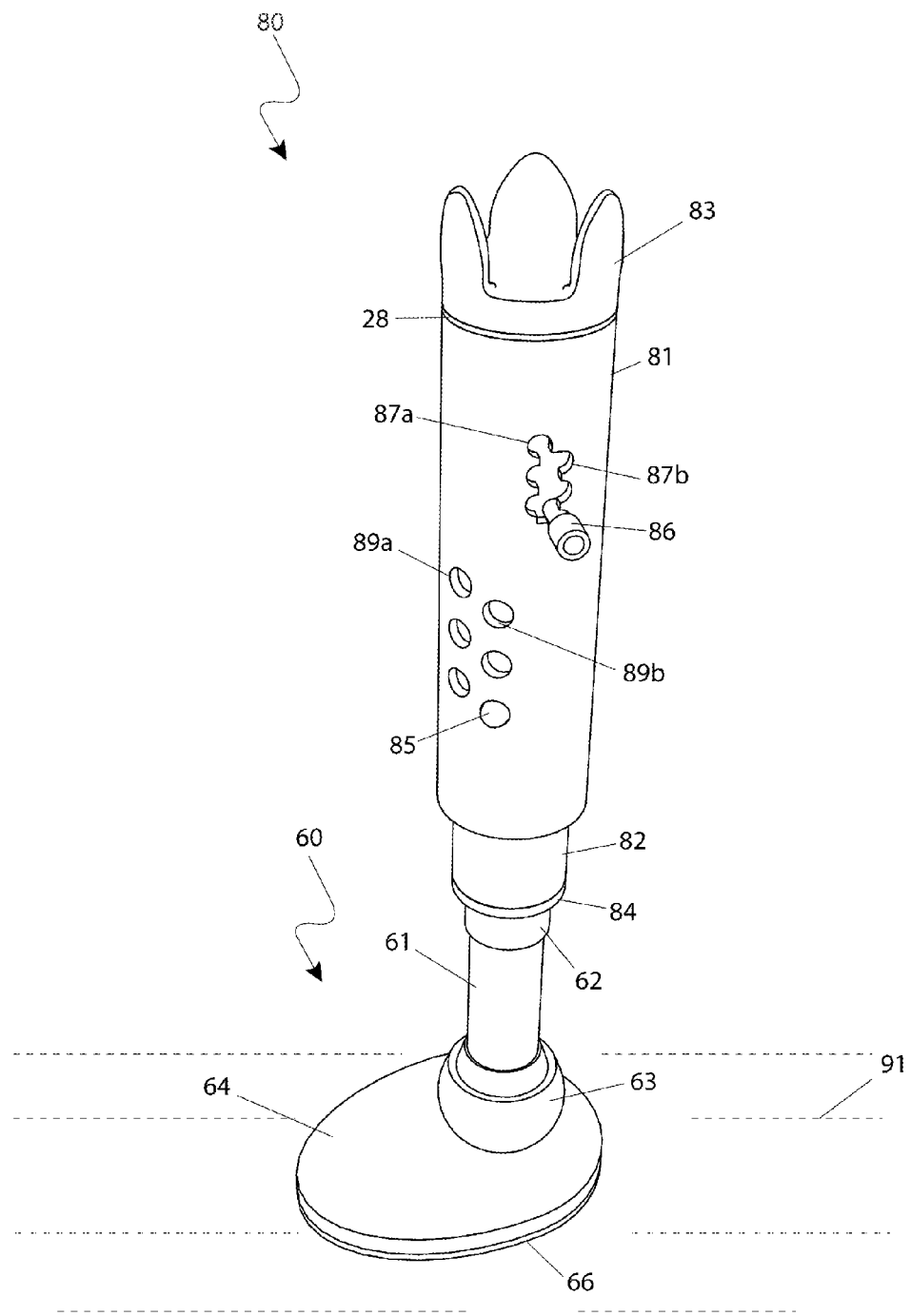
FIG. 6a is perspective view of an alternate portable auxiliary jack stand system 80 for the two-wheeled vehicle 90, according to an alternate embodiment of the present invention.
Figure 6B:
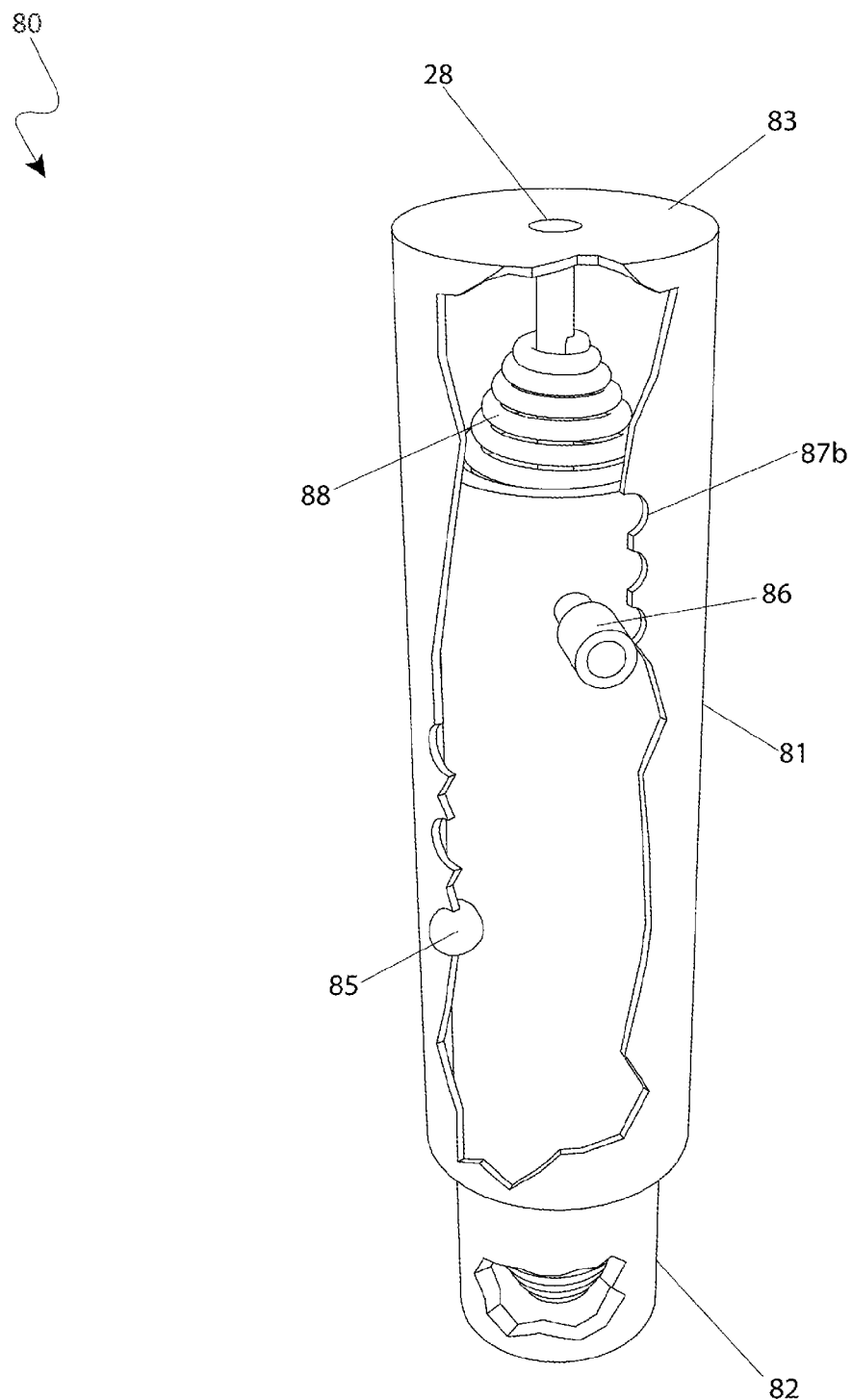
FIG. 6b is perspective partially cut-away view of the alternate portable auxiliary jack stand system 80 for the two-wheeled vehicle 90, according to the alternate embodiment of the present invention; and, FIG. 6c is perspective cut-away partial view of the bottom portion 84 of the alternate portable auxiliary jack stand system 80 for the two-wheeled vehicle 90, according to the alternate embodiment of the present invention.

The best mode for carrying out the invention is presented in terms of its preferred embodiment, herein depicted within FIGS. 1 through 5b and in terms of an alternate embodiment, herein depicted within FIGS. 6a through 6c. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a device and method for a portable auxiliary jack stand (herein described as the "system") 10, which provides a means for adding stability to a parked two-wheeled vehicle 90.

Referring now to FIG. 1, an environmental perspective view of a system 10, according to the preferred embodiment of the present invention, is disclosed. The system 10 is depicted in a status of providing additional stability while installed onto a parked two-wheeled vehicle.

Figure 2:
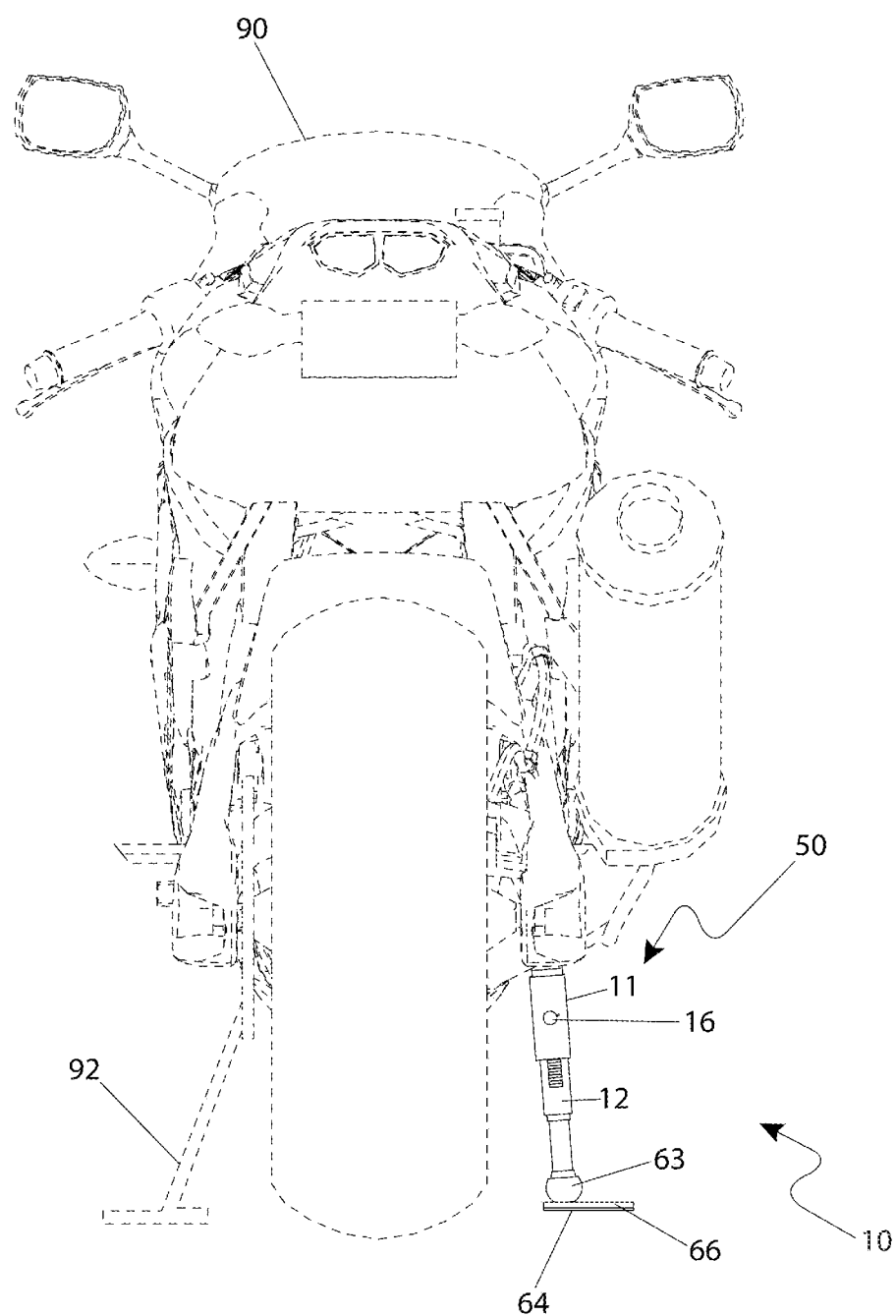
FIG. 2 is an environmental rear view of the portable auxiliary jack stand system 10 for the two-wheeled vehicle 90, according to the preferred embodiment of the present invention.

Referring now to FIG. 2, an environmental rear view of the system 10, according to the preferred embodiment of the present invention, is disclosed. The system 10 is depicted as stabilizing the parked two-wheeled vehicle 90 by supporting the right side of the vehicle 90. The system 10 comprises a tri-furcated adapter 50 and a ball jointed foot pad assembly 60. The tri-furcated adapter is engaging a suitable structural portion of the vehicle 90.

Figure 3A:
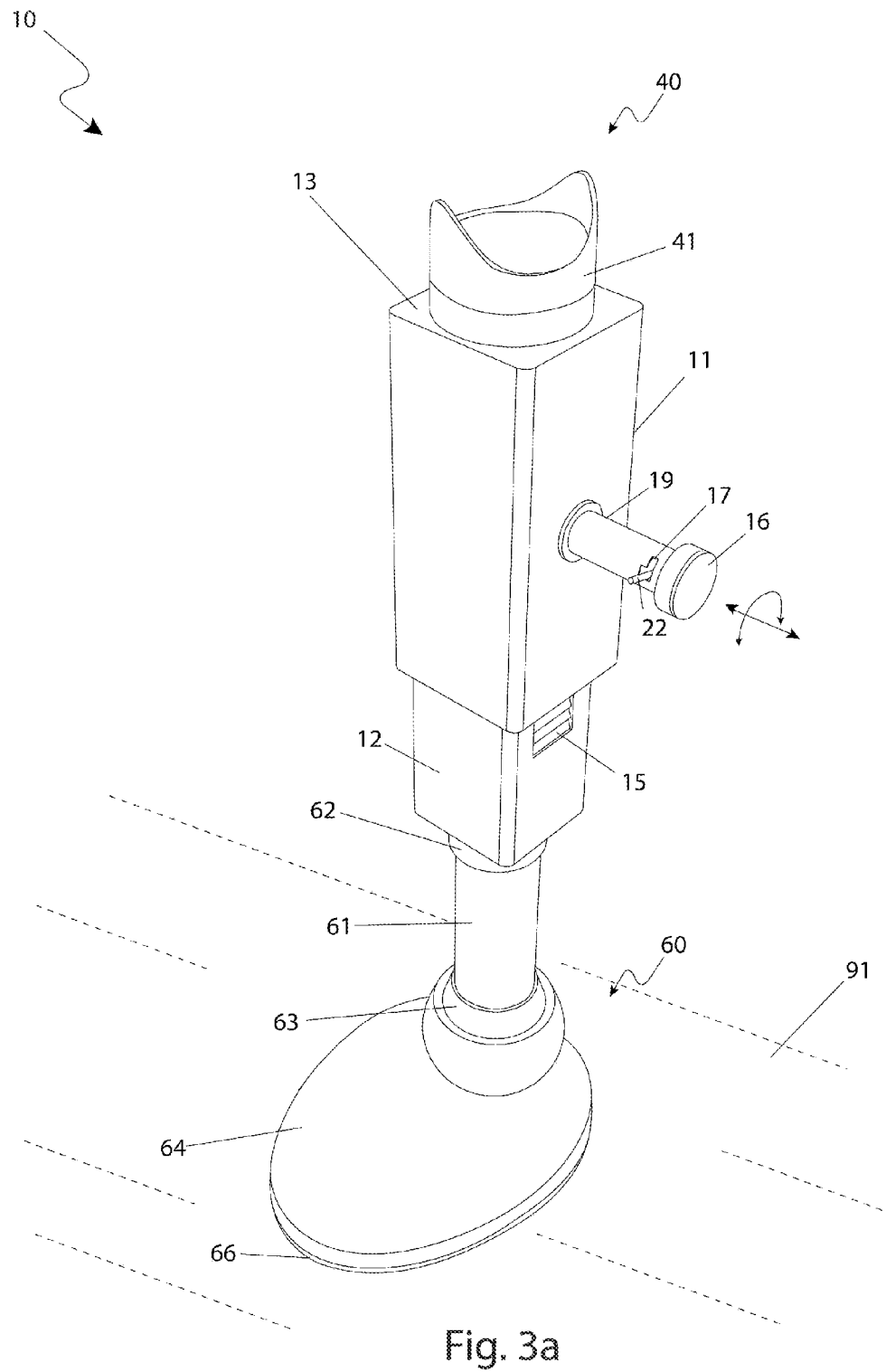
FIG. 3a is perspective view of the portable auxiliary jack stand system 10 for the two-wheeled vehicle 90, according to the preferred embodiment of the present invention.

Referring now to FIG. 3a, a perspective view of the system 10, according to the preferred embodiment of the present invention, is disclosed. The system 10 comprises a first telescoping member 11 comprising a top portion 13 and a pawl housing 19 envisioned to be an integral part of a face of the first telescoping member 11 by being welded or permanently mechanically or chemically bonded onto. The bi-furcated adapter 40 is removably and pivotally installed onto the top portion 13 of the first telescoping member 11 by means of a first pin 42 engaged through an adapter mounting aperture 28 and secured by a detent ball 43 engaging the underside surface portion of the top portion 13. A second telescoping member 12 comprising a bottom portion 14 and an integral ratchet 15 is designed to slide upwardly and downwardly within the interior portion of the first telescoping member 11 without allowing any detrimental lateral play. The ball-joint foot 60 is removably and pivotally installed against the bottom portion 14 of the second telescoping member 12 by means of a first stem 61 engaged through a foot mounting aperture 29 and secured by a detent ball 43 engaging the inner top surface portion of the bottom portion 14 of the second telescoping member 12.

Figure 3B:
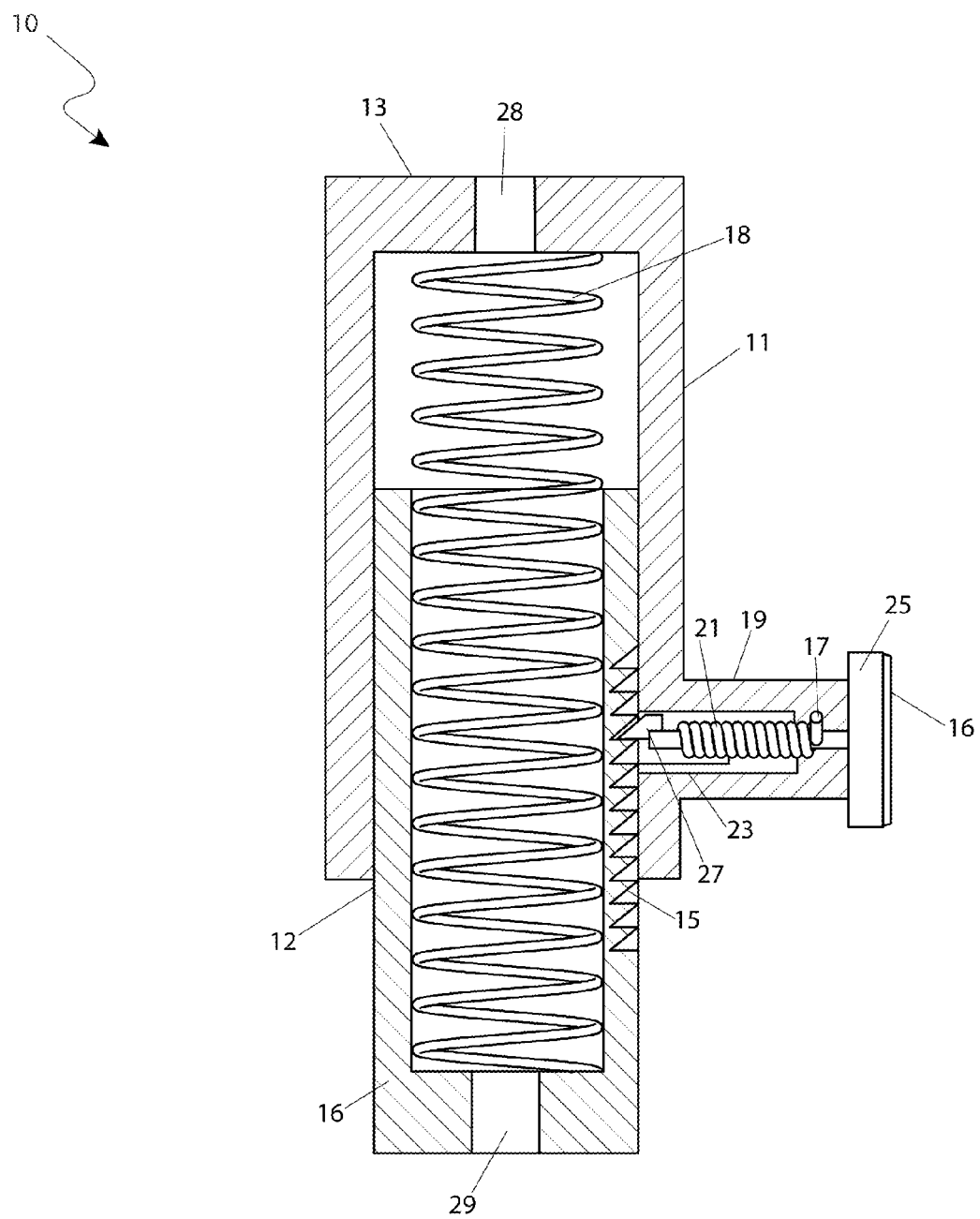
FIG. 3b is an orthographic cross-section view of the portable auxiliary jack stand system 10 for the two-wheeled vehicle 90, according to the preferred embodiment of the present invention.

Referring now to FIG. 3b, an orthographic cross-section view of the system 10, according to the preferred embodiment of the present invention, is disclosed. The system 10 comprises the first telescoping member 11 with the integral pawl housing 19 enclosing a pawl spring 21, a spindle 23, and a pawl 24. The pawl spring 24 encircles the spindle 23 and abuts against the rear face portion of the pawl 24. The opposing pawl spring end 22 is engaged through a cross-aperture of the spindle 23 and a protruding portion of the pawl spring end 22 engages a gate 17. A first end 24 of the spindle 23 slidingly engages a bore 27 within the pawl 24 and a second end 25 protrudes beyond the end portion of the pawl housing 19 and is securely fastened onto an adjusting knob 16. The second telescoping member 12 comprises the ratchet 15 which provides a selective adjustment in conjunction with the pawl 24, thereby allowing the combined length of the assembly of the first telescoping member 11 and the second telescoping member 12 to be selectively adjusted in small increments. It is envisioned that the telescoping members 11 and 12 are made of commercially available square, rectangular, hexagon or circular steel tubing whereby the top portion 13 and the bottom portion 14 are welded or permanently bonded onto an open end of the tubing members 11 and 13. Alternately, the inverted squared "U"-shape of the first telescoping member and the upright squared "U"-shape of the second telescoping member can be generated by means of a deep drawing process. The ratchet 15 is envisioned to be cut directly within the tubing wall thickness of the second telescoping member 12, or to be machined as a separate component 15 and be subsequently affixed integrally within a window previously cut hereinto the wall of the second telescoping member 12. The inside space portion of the assembly of the first telescoping member 11 and the second alternate telescoping member 12 comprises a main spring 18 intended to assist in the deployment of the system 10.

Figure 3C:
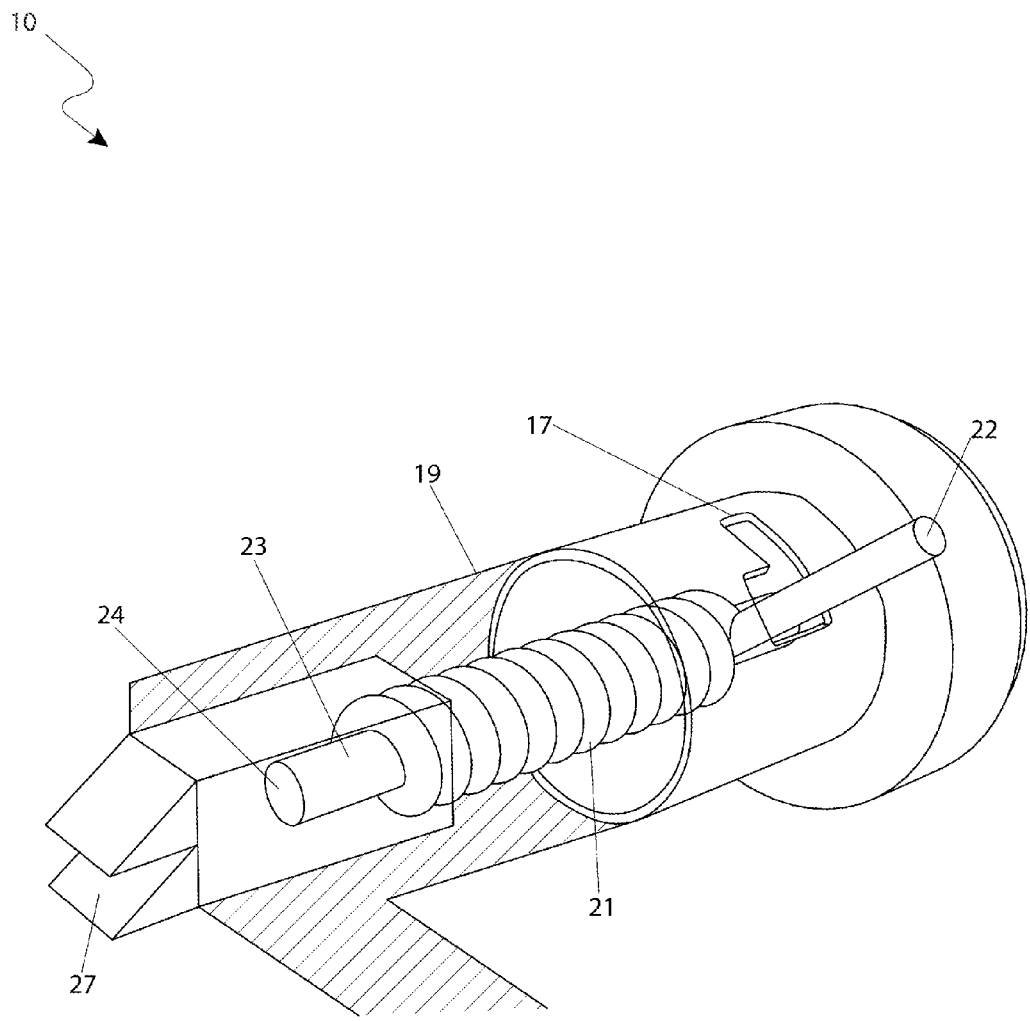
FIG. 3c is a perspective transparent view of a pawl mechanism assembly of the portable auxiliary jack stand system 10 for the two-wheeled vehicle 90, according to the preferred embodiment of the present invention.

Referring now to FIG. 3c, a transparent perspective view of the pawl mechanism assembly of the system 10, according to the preferred embodiment of the present invention, is disclosed. The mechanism is contained within the pawl housing 19 and comprises the pawl 26, the spindle 23 and the pawl spring 21. The pawl spring 21 acts against a rear face of the pawl 26 thereby engaging the pawl 21 into the ratchet 15 and allows the combined length of the assembly of the first telescoping member 11 and the second telescoping member to be selectively incrementally increased. The pawl spring end 22 is inserted through a radial aperture of the spindle 23 and protrudes hereinto a gate 17 cut through the wall of the pawl housing 19. The positioning of the protruding pawl spring end 22 into a forward notch of the gate 17 compresses the pawl spring 21 into its solid height, thus causing the pawl 26 to firmly lock the ratchet 15 and therefore the height of the system 10. Rotating the adjusting knob 16 clockwise by a fraction of a turn releases the spring end 22 from the forward notch of the gate 17, thus releasing the pawl spring 21 to the extent of allowing the normal interaction between the pawl 26 and the ratchet 15 which allows the length of the system 10 to be selectively increased incrementally. A further minor clockwise rotation of the adjusting knob 16 sets the pawl spring end 22 into a position within the gate 17 whereby the interaction between the pawl 26 and the ratchet 15 is eliminated. This mode allows the second telescoping member 12 to be freely pushed into the first telescoping member 11, thereby collapsing the system 10 into a storage length.

Referring now to FIG. 4a, a perspective view the bi-furcated adapter 40 for the portable auxiliary jack stand system 10, according to the preferred embodiment of the present invention, is disclosed. The adapter 40 comprises a first body 41, envisioned to be a casting, a weldment, or a machined member. Furthermore, the adapter 40 comprises a first pin 42 and a detent ball 43. The first pin 42 is designed to removably install the adapter onto the top portion of the first telescoping member 11 by being inserted into the adapter mounting aperture 28 and by allowing the detent ball 43 to engage the underside surface portion of the top portion 13. The bi-furcated adapter 40 is envisioned to be useful in engaging circular structural members of the two-wheeled vehicle 90.

Referring now to FIG. 4b, a perspective view the tri-furcated adapter 50 for the portable auxiliary jack stand system 10, according to the preferred embodiment of the present invention, is disclosed. The adapter 50 comprises a second body 51, envisioned to be a casting, a weldment, or a machined member. Furthermore, the adapter 50 comprises a second pin 52 and the detent ball 43. In a manner similar to the adapter 40, the second pin 52 is designed to removably install the adapter onto the top portion of the first telescoping member 11 by being inserted into the adapter mounting aperture 28 and by allowing the detent ball 43 to engage the underside surface portion of the top portion 13. The tri-furcated adapter 50 is envisioned to be useful in engaging rectangular or flat structural members of the two-wheeled vehicle 90.

Referring now to FIG. 5a, a perspective view the ball joint foot pad assembly 60 for the portable auxiliary jack stand system 10, according to the preferred embodiment of the present invention, is disclosed. The assembly 60 comprises a first stem 61, a first shoulder 62, a ball joint 63, and a base 64 which is eccentrically integrally affixed thereto the underside portion of the ball joint 63 housing. The interaction between the eccentric mounting of the base 64 and the ball joint 63 allows an infinite variation for the positioning of the system 10 relative to the degree of inclination of the ground 91. It is envisioned that the base 64 preferably comprises a bottom surface having a hard rubber anti-skid surface 66 or other anti-skid configuration such as, but not limited to: cleats, grooves, or spikes, and that the shoulder 62 is a shrink-fitted member or an integrally machined element of the first stem 61. The foot pad assembly 60 is designed to be removably installed by inserting the upper end of the first stem 61 into the foot mounting aperture 29 until the detent ball 43 engages the outside underside surface of the bottom portion 14 of the second telescoping member 12 rests thereupon the first shoulder 62.

Referring now to FIG. 5b, a perspective view of a serrated foot assembly 70 for the portable auxiliary jack stand system 10, according to the preferred embodiment of the present invention, is disclosed. The assembly 70 comprises a second stem 71, a second shoulder 73, and a foot 73 comprising a plurality of serrations 74. The foot assembly 70 is designed to be installed in a manner which is similar to the manner in which the foot assembly 60 is installed.

Referring now to FIG. 6a, a perspective view of an alternate auxiliary stand 80, according to an alternate embodiment of the present invention, is disclosed. The alternate stand 80 comprises an alternate first telescoping member 81 comprising an alternate top portion 83. The alternate first telescoping member furthermore comprises a plurality of first position notches 87a and second position notches 87b and a plurality of first detent apertures 89a and second detent apertures 89b. The bi-furcated adapter 40 is removably and pivotally installed onto the top portion 83 of the first telescoping member 81 by means of the first pin 42 engaged through an adapter mounting aperture 28 and secured by a detent ball 43 engaging the underside surface portion of the top portion 83. A second telescoping member 82 comprises a bottom portion 84, a grip 86 and a detent bullet 85. The second telescoping member 82 is designed to slide upwardly and downwardly snugly within the interior portion of the first telescoping member 81 without allowing any detrimental lateral play. The ball-joint foot 60 is removably and pivotally installed against the bottom portion 84 of the second telescoping member 82 by means of a first stem 61 engaged through a foot mounting aperture 29 and secured by a detent ball 43 engaging the inner top surface portion of the bottom portion 14 of the second telescoping member 12. The configuration comprising the staggered rows of detent apertures 89a and 89b is intended to provide smaller selective length adjusting increments than a single row would provide. A grip 86 threaded into the telescoping member 82 allows the member 82 to be rotated by a fraction of a turn which corresponds to the peripheral distance between the centerline of the row comprising the first detent apertures 89a and the row comprising the second detent apertures 89b. Engaging the grip 86 within any position notch 87a or 87b engages the detent bullet 85 into a corresponding detent aperture 89a or 89b, thereby firmly locking the length of the alternate auxiliary stand 80.

Referring now to FIG. 6b, a perspective partially cut-away view of the alternate auxiliary stand 80, according to the alternate embodiment of the present invention, is disclosed. The inside space portion of the assembly of the first alternate telescoping member 81 and the second alternate telescoping member 82 comprises an alternate main spring 88 intended to assist in the deployment of the stand 80. The telescoping members 81 and 82 are envisioned to be made of commercially available tubing, wherein the ends are closed by welding or integrally fastening the top portion 83 and the bottom portion 84 into an open end or by producing the appropriate configurations by deep drawing.

Referring now to FIG. 6c, a perspective cut-away partial view of the bottom portion 84 of the alternate portable auxiliary jack stand 80, according to the alternate embodiment of the present invention, is disclosed. The bottom portion comprises the foot mounting aperture 29. It is envisioned that the alternate stand 80 is intended to accept the similar adapters 40 and 50 and the similar foot assemblies 60 and 70 as the preferred embodiment 10.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the system 10, it would be installed as indicated in FIG. 1.

The method of utilizing the system 10 may be achieved by performing the following steps: choosing a parking place for the vehicle 90; parking the vehicle 90 by deploying the kick stand 92; evaluating the texture and the slope of the ground 92; choosing an appropriate structural member of the vehicle 90; selecting a suitable foot assembly 60, 70 or the like; selecting one of the adapters 40 or 50; measuring the needed length of the system 10; setting the position of the adjusting knob 16 to obtain the ratcheting mode; deploying the system 10 to the length needed to stabilize the vehicle 90; inserting the system 10 under the vehicle 90; making a final length adjustment; setting the adjusting knob 16 to the ratchet 15 locking position; ascertaining the stability of the parked vehicle; removing the system 80 by setting the adjusting knob 16 to the ratchet 15 releasing position; collapsing the telescoping members 11 and 12 into the minimum system 10 length; removing the adapter 40 or 50; removing the foot assembly 60 or 70; cleaning, packing and storing the system 10.

The method of utilizing the alternate system 80 may be achieved by performing the following steps: choosing a parking place for the vehicle 90; parking the vehicle 90 by deploying the kick stand 92; evaluating the texture and the slope of the ground 92; choosing an appropriate structural member of the vehicle 90; selecting a suitable foot assembly 60, 70 or the like; selecting one (1) of the adapters 40 or 50; measuring the needed length of the system 10; deploying the alternate system 80 to the length needed to stabilize the vehicle 90; setting the grip 86 into one of the position notches 87a or 87b to allow the detent bullet 85 to engage the appropriate detent aperture 89a or 89b; inserting the alternate system 80 under the vehicle 90; ascertaining the stability of the parked vehicle; removing the alternate system 80 by following the above steps in a reverse order; removing the adapter 40 or 50; removing the foot assembly 60 or 70; cleaning, packing and storing the alternate system 80.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A portable auxiliary jack stand system for stabilizing a two-wheeled vehicle at a parked position, said portable auxiliary jack stand system comprising:
   an adapter adapted to be engaged to the two-wheeled vehicle;
   a first telescopic member, comprising:
      a top portion connected to said adapter;
      a mounting aperture for receiving said adapter therein;
      a pawl housing having a gate;
      a spindle having first and second ends;
      a pawl spring having an end protruding towards said gate;
      a pawl protruding through said first telescopic member; and,
      an adjusting knob attached to said spindle;
      wherein said first end of said spindle slidingly engages said pawl; and,
      wherein said second end of said spindle is securely fastened to said adjusting knob;
   a second telescopic member slidably engaged with said first telescopic member;
   a main spring situated inside said first and second telescoping members; and,
   a foot pad assembly attached to said second telescopic member;
   wherein said first telescopic member is adjustably locked to said second telescopic member at alternate heights.

2. The portable auxiliary jack stand system of claim 1, wherein said adapter comprises: one of a bi-furcated adapter and a tri-furcated adapter, each of said bi-furcated and tri-furcated adapters comprising: a body;
   a pin; and,
   a detent ball;
   wherein said adapter is removably engaged to said first telescopic member such that said pin and said detent ball are engaged to said top portion of said first telescopic member.

3. The portable auxiliary jack stand system of claim 1, wherein said second telescopic member comprises:
   a bottom portion having a foot mounting aperture; and,
   a ratchet slidably engaged to an interior portion of said first telescoping member;
   wherein said pawl spring acts against a rear face of said pawl and positions said pawl into said ratchet; and,
   wherein said ratchet and said pawl adjust a combined length of said first and second telescoping members.

4. The portable auxiliary jack stand system of claim 3, wherein said foot pad assembly comprises: one of a ball jointed foot pad assembly and a serrated foot pad assembly.

5. The portable auxiliary jack stand system of claim 4, wherein said ball jointed foot pad assembly comprises:
   a stem removably and pivotally engaged to said bottom portion of said second telescopic member;
   a shoulder attached to said stem;
   a ball joint attached to said stem; and,
   a base eccentrically and rotatably affixed to an underside portion of said ball joint;
   wherein said bottom portion of said second telescoping member rests upon said shoulder.

6. The portable auxiliary jack stand system of claim 4, wherein said serrated foot assembly comprises:
   a stem;
   a shoulder attached to said stem; and,
   a foot connected to said stem and having a plurality of serrations;
   wherein said bottom portion of said second telescoping member rests upon said shoulder.

7. The portable auxiliary jack stand system of claim 6, wherein said pawl locks said ratchet at a desired height when said pawl spring end is positioned into said gate and thereby compresses said pawl spring.

8. The portable auxiliary jack stand system of claim 1, wherein said first telescoping member comprises:
   a plurality of first and second position notches; and,
   a plurality of first and second detent apertures;
   wherein said second telescoping member comprises a grip and a detent bullet configured in such a manner that said grip rotates said second telescoping member by a corresponding peripheral distance defined between a centerline of said first detent apertures and said second detent apertures; and,
   wherein engagement of said grip in said notch causes said detent bullet to engage a corresponding detent aperture and thereby lock a length of said auxiliary stand at a desired position.

9. A portable auxiliary jack stand system for stabilizing a two-wheeled vehicle at a parked position, said portable auxiliary jack stand system comprising:
   an adapter adapted to be engaged to the two-wheeled vehicle;
   a first telescopic member, comprising:
      a top portion connected to said adapter;
      a mounting aperture for receiving said adapter therein;
      a pawl housing having a gate;
      a spindle having first and second ends;
      a pawl spring having an end protruding towards said gate;
      a pawl protruding through said first telescopic member; and,
      an adjusting knob attached to said spindle;
      wherein said first end of said spindle slidingly engages said pawl; and,
      wherein said second end of said spindle is securely fastened to said adjusting knob;
   a second telescopic member slidably engaged with said first telescopic member;
   a main spring situated inside said first and second telescoping members; and,
   a foot pad assembly removably and pivotally attached to said second telescopic member;
   wherein said first telescopic member is adjustably locked to said second telescopic member at alternate heights.

10. The portable auxiliary jack stand system of claim 9, wherein said adapter comprises: one of a bi-furcated adapter and a tri-furcated adapter, each of said bi-furcated and tri-furcated adapters comprising:
   a body;
   a pin; and,
   a detent ball;

wherein said adapter is removably engaged to said first telescopic member such that said pin and said detent ball are engaged to said top portion of said first telescopic member.

11. The portable auxiliary jack stand system of claim 9, wherein said second telescopic member comprises:
   a bottom portion having a foot mounting aperture; and,
   a ratchet slidably engaged to an interior portion of said first telescoping member;
   wherein said pawl spring acts against a rear face of said pawl and positions said pawl into said ratchet; and,
   wherein said ratchet and said pawl adjust a combined length of said first and second telescoping members.

12. The portable auxiliary jack stand system of claim 11, wherein said foot pad assembly comprises: one of a ball jointed foot pad assembly and a serrated foot pad assembly.

13. The portable auxiliary jack stand system of claim 12, wherein said ball jointed foot pad assembly comprises:
   a stem removably and pivotally engaged to said bottom portion of said second telescopic member;
   a shoulder attached to said stem;
   a ball joint attached to said stem; and,
   a base eccentrically and rotatably affixed to an underside portion of said ball joint;
   wherein said bottom portion of said second telescoping member rests upon said shoulder.

14. The portable auxiliary jack stand system of claim 12, wherein said serrated foot assembly comprises:
   a stem;
   a shoulder attached to said stem; and,
   a foot connected to said stem and having a plurality of serrations;
   wherein said bottom portion of said second telescoping member rests upon said shoulder.

15. The portable auxiliary jack stand system of claim 14, wherein said pawl locks said ratchet at a desired height when said pawl spring end is positioned into said gate and thereby compresses said pawl spring.

16. The portable auxiliary jack stand system of claim 9, wherein said first telescoping member comprises:
   a plurality of first and second position notches; and
   a plurality of first and second detent apertures;
   wherein said second telescoping member comprises a grip and a detent bullet configured in such a manner that said grip rotates said second telescoping member by a corresponding peripheral distance defined between a centerline of said first detent apertures and said second detent apertures; and,
   wherein engagement of said grip in said notch causes said detent bullet to engage a corresponding detent aperture and thereby lock a length of said auxiliary stand at a desired position.

17. A method of utilizing a portable auxiliary jack stand system for stabilizing a two-wheeled vehicle at a parked position, said method comprising the steps of:
   providing and engaging an adapter to a two-wheeled vehicle;
   providing and connecting a top portion of a first telescopic member to said adapter;
   providing and slidably engaging a second telescopic member with said first telescopic member;
   providing and situating a main spring inside said first and second telescoping members;
   providing a foot pad assembly;
   removably and pivotally attaching said foot pad assembly to said second telescopic member; and,
   adjustably locking said first telescopic member to said second telescopic member at alternate heights;
   wherein said first telescopic member comprises a mounting aperture for receiving said adapter therein, a pawl housing having a gate, a spindle having first and second ends, a pawl spring having an end protruding towards said gate, a pawl protruding through said first telescopic member, and an adjusting knob attached to said spindle.

* * * * *